US008360290B2

(12) United States Patent
Flynn et al.

(10) Patent No.: US 8,360,290 B2
(45) Date of Patent: Jan. 29, 2013

(54) METHOD FOR SEPARATING LABEL ASSEMBLY

(75) Inventors: Timothy J. Flynn, Key Largo, FL (US); Thomas E. Flynn, Crystal Lake, IL (US); Patrick J. Flynn, Redlands, CA (US); Brian Zimmerman, Yucaipa, CA (US)

(73) Assignee: Timothy J. Flynn, Key Largo, FL (US)

(*) Notice: Subject to any disclaimer, the term of this patent is extended or adjusted under 35 U.S.C. 154(b) by 732 days.

(21) Appl. No.: 12/381,509

(22) Filed: Mar. 12, 2009

(65) Prior Publication Data

US 2010/0230460 A1 Sep. 16, 2010

Related U.S. Application Data

(63) Continuation-in-part of application No. 11/901,414, filed on Sep. 17, 2007, now Pat. No. 8,273,436.

(51) Int. Cl.
*B26F 3/00* (2006.01)
*B32B 33/00* (2006.01)

(52) U.S. Cl. .......................................... 225/2; 428/42.3

(58) Field of Classification Search ................. 428/42.3, 428/43, 40.1; 225/1, 2
See application file for complete search history.

(56) References Cited

U.S. PATENT DOCUMENTS

| | | | |
|---|---|---|---|
| 2,276,297 | A | 3/1942 | Flood |
| 2,303,346 | A | 12/1942 | Flood |
| 2,331,019 | A | 10/1943 | Flood |
| 2,434,545 | A | 1/1948 | Brady, Jr. et al. |
| 2,679,928 | A | 6/1954 | Bishop, Jr. et al. |
| 2,765,205 | A | 10/1956 | Capella et al. |
| 2,883,044 | A | 4/1959 | Kendrick |
| 3,038,597 | A | 6/1962 | Brady, Jr. |
| 3,480,198 | A | 11/1969 | Repko |
| 3,568,829 | A | 3/1971 | Brady, Jr. |
| 3,822,492 | A | 7/1974 | Crawley |
| 3,896,246 | A | 7/1975 | Brady, Jr. |
| 3,914,483 | A | 10/1975 | Stipek, Jr. |
| 4,032,679 | A | 6/1977 | Aoyagi |
| 4,217,164 | A | 8/1980 | La Mers |
| 4,264,662 | A | 4/1981 | Taylor et al. |

(Continued)

FOREIGN PATENT DOCUMENTS

| | | |
|---|---|---|
| DE | 296 13 123 | 11/1996 |
| EP | 0 765 514 | 4/1997 |

(Continued)

OTHER PUBLICATIONS

Co-Pending U.S. Appl. No. 12/381,508, filed Mar. 12, 2009; inventors Timothy J. Flynn et al.; title Apparatus for Separating Label Assembly.

*Primary Examiner* — Stephen Choi
(74) *Attorney, Agent, or Firm* — Pauley Petersen & Erickson

(57) ABSTRACT

A label assembly including a face sheet, a back sheet, and a layer of an adhesive positioned between the face sheet and the back sheet. A separation line divides the label assembly into at least two portions. The separation line is formed by a first tearable line of separation extending across the back sheet and a second tearable line of separation extending across the face sheet. The first tearable line of separation is offset with respect to the second tearable line of separation, and at least one of the first and second tearable lines of separation includes a non-linear portion directed toward and/or an angled portion extending at an angle to an other of the at least one of the first and second tearable lines of separation.

10 Claims, 5 Drawing Sheets

U.S. PATENT DOCUMENTS

| | | | | |
|---|---|---|---|---|
| 4,428,857 | A | 1/1984 | Taylor et al. | |
| 4,648,930 | A | 3/1987 | La Mers | |
| 4,706,877 | A | 11/1987 | Jenkins | |
| 4,771,891 | A | 9/1988 | Sorensen et al. | |
| 4,881,935 | A | 11/1989 | Slobodkin | |
| 4,881,936 | A | 11/1989 | Slobodkin | |
| 4,910,058 | A | 3/1990 | Jameson | |
| 5,011,559 | A | 4/1991 | Felix | |
| 5,031,939 | A | 7/1991 | Webendorfer et al. | |
| 5,182,152 | A | 1/1993 | Ericson | |
| 5,318,325 | A | 6/1994 | Ipsen | |
| 5,324,153 | A | 6/1994 | Chess | |
| 5,328,538 | A | 7/1994 | Garrison | |
| 5,484,168 | A | 1/1996 | Chigot | |
| 5,520,990 | A | 5/1996 | Rotermund | |
| 5,633,071 | A | 5/1997 | Murphy | |
| 5,658,631 | A | 8/1997 | Bernstein et al. | |
| 5,686,159 | A | 11/1997 | Langan | |
| 5,700,535 | A | 12/1997 | Galsterer et al. | |
| 5,756,175 | A | 5/1998 | Washburn | |
| 5,788,284 | A | 8/1998 | Hirst | |
| 5,947,525 | A | 9/1999 | Pollman | |
| 5,997,683 | A | 12/1999 | Popat | |
| 6,132,829 | A | 10/2000 | Kennerly et al. | |
| 6,136,130 | A | 10/2000 | Tataryan et al. | |
| 6,170,879 | B1 | 1/2001 | Rawlings | |
| 6,284,708 | B1 | 9/2001 | Oshima et al. | |
| 6,361,078 | B1 | 3/2002 | Chess | |
| 6,385,860 | B1 * | 5/2002 | MacWilliams et al. | 33/613 |
| 6,391,136 | B1 | 5/2002 | Stickelbrocks | |
| 6,410,111 | B1 | 6/2002 | Roth et al. | |
| 6,413,604 | B1 | 7/2002 | Matthews et al. | |
| 6,656,555 | B1 | 12/2003 | McKillip | |
| 6,803,084 | B1 | 10/2004 | Do et al. | |
| 6,837,957 | B2 * | 1/2005 | Flynn et al. | 156/252 |
| 6,860,050 | B2 * | 3/2005 | Flynn et al. | 40/638 |
| 7,794,812 | B2 * | 9/2010 | Sanford | 428/40.2 |
| 2002/0086127 | A1 | 7/2002 | Hodsdon et al. | |
| 2002/0096874 | A1 | 7/2002 | Viby | |
| 2003/0072976 | A1 * | 4/2003 | Sanford | 428/914 |
| 2004/0033326 | A1 | 2/2004 | Tataryan et al. | |
| 2004/0137198 | A1 | 7/2004 | Flynn et al. | |
| 2004/0213943 | A1 | 10/2004 | Viby | |
| 2005/0089663 | A1 | 4/2005 | Wong et al. | |
| 2005/0193608 | A1 | 9/2005 | Flynn et al. | |
| 2006/0110565 | A1 | 5/2006 | Tataryan et al. | |
| 2008/0141568 | A1 | 6/2008 | Flynn | |
| 2009/0075010 | A1 * | 3/2009 | Flynn | 428/42.3 |

FOREIGN PATENT DOCUMENTS

| | | | |
|---|---|---|---|
| FR | 2 706 214 | A | 12/1994 |
| FR | 2 724 479 | A | 3/1996 |
| GB | 2177373 | | 1/1987 |
| JP | 56-145069 | | 11/1981 |
| JP | 60-11370 | | 1/1985 |
| JP | 64-43380 | | 3/1989 |
| JP | H0511575 | | 3/1993 |
| JP | 07-306641 | | 11/1995 |
| JP | 08-137403 | | 5/1996 |
| JP | 11-030954 | | 2/1999 |
| JP | 11-045051 | | 2/1999 |
| JP | 2001-101827 | | 4/2001 |
| JP | 2002-82615 | | 3/2002 |
| WO | WO 92 19457 | A | 11/1992 |
| WO | WO 95 34879 | A | 12/1995 |
| WO | WO 97/01495 | | 1/1997 |
| WO | WO 99/31644 | | 6/1999 |
| WO | WO 00/32412 | | 6/2000 |
| WO | WO 01/84550 | | 11/2001 |
| WO | WO 01/89825 | | 11/2001 |
| WO | WO 02/26483 | | 4/2002 |
| WO | WO 2004/078468 | | 9/2004 |

* cited by examiner

METHOD FOR SEPARATING LABEL ASSEMBLY

CROSS REFERENCE TO RELATED APPLICATION

This U.S. Patent application is a Continuation-In-Part of U.S. patent application Ser. No. 11/901,414, filed on 17 Sep. 2007 now U.S. Pat. No. 8,273,436.

BACKGROUND OF THE INVENTION

1. Field of the Invention

This invention relates generally to a label assembly and, more particularly, to a sheet of self-adhesive labels that are more easily removed from a backing and/or a surrounding matrix, and a corresponding method.

2. Discussion of Related Art

Self-adhesive labels on printable sheets for printing, such as through a mechanical printer, an electromechanical printer, a printing press, a digital printing or imaging device, having individual address labels are known. After printing, each label is removed from the sheet and applied to the desired substrate, such as an envelope for mailing. Removal of the labels by hand is generally performed by bending back the label sheet in a vicinity of a corner of the first label to be removed, which causes separation of the label and the liner. U.S. Patent Application Publication 2005/0089663 describes an attempt to make the removal of these labels easier or more efficient for the user. There remains a need for further improvements for label sheets to promote efficient label removal, particularly for relatively large mailings or projects.

SUMMARY OF THE INVENTION

A general object of the invention is to provide an improved label assembly having a removable portion for exposing an end portion of the labels thereon.

A more specific objective of the invention is to overcome one or more of the problems described above.

The general object of the invention can be attained, at least in part, through a label assembly including a face sheet, a back sheet, and a layer of an adhesive positioned between the face sheet and the back sheet. A separation line divides the label assembly into at least two portions. The separation line is formed by a first tearable line of separation extending across the back sheet and a second tearable line of separation extending across the face sheet. The first tearable line of separation can be offset with respect to the second tearable line of separation, and the separation line includes, at an end, a non-linear portion and/or an angled portion of one of the first and second tearable lines of separation extending at an angle to an other of the at least one of the first and second tearable lines of separation.

The invention further comprehends a label assembly including a back sheet and a face sheet releasably adhered to the back sheet. The face sheet includes a label column of a plurality of labels and a matrix bordering the label column. Each label can abut a portion of the matrix and can be separated from the portion of the matrix, for example by at least one die cut. A first tearable line of separation is formed in the back sheet and runs below the labels within the label column. A second tearable line of separation is formed in the matrix, and the first and second tearable lines of separation are offset from each other. In some embodiments of the invention, at least one of the first and second tearable lines of separation is or includes an angled portion extending at an angle to an other of the first and second tearable lines of separation. In other embodiments of the invention, the first tearable line of separation and/or the second tearable line of separation includes a non-linear end portion, such as an arcuate end portion.

The invention still further comprehends a method for using a label assembly having a face sheet adhered to a back sheet and including a plurality of labels disposed in a label column. The method includes: routing the label assembly through a printer and printing on a first portion of the label assembly; separating the back sheet along a first tearable line of separation which extends at least partially below the label column; separating the face sheet along a second tearable line of separation that is offset with respect to the first tearable line of separation and that extends between a label assembly edge and the label column; tearing a first portion of at least one of the first and second tearable lines of separation at an angle away from an adjacent portion of an other of the first and second tearable lines of separation; tearing a second portion of the at least one of the first and second tearable lines of separation to expose an edge portion of each of the plurality of labels disposed in the label column; and removing at least one of the plurality of labels from the face sheet by pulling from the exposed edge portion.

Other objects and advantages will be apparent to those skilled in the art from the following detailed description taken in conjunction with the appended claims and drawings.

DETAILED DESCRIPTION OF THE EXEMPLARY EMBODIMENTS

Each of U.S. Pat. Nos. 6,837,957 and 6,860,050 and the entire disclosure of each is incorporated into this specification by reference to U.S. Pat. Nos. 6,837,957 and 6,860,050.

Figure 1:
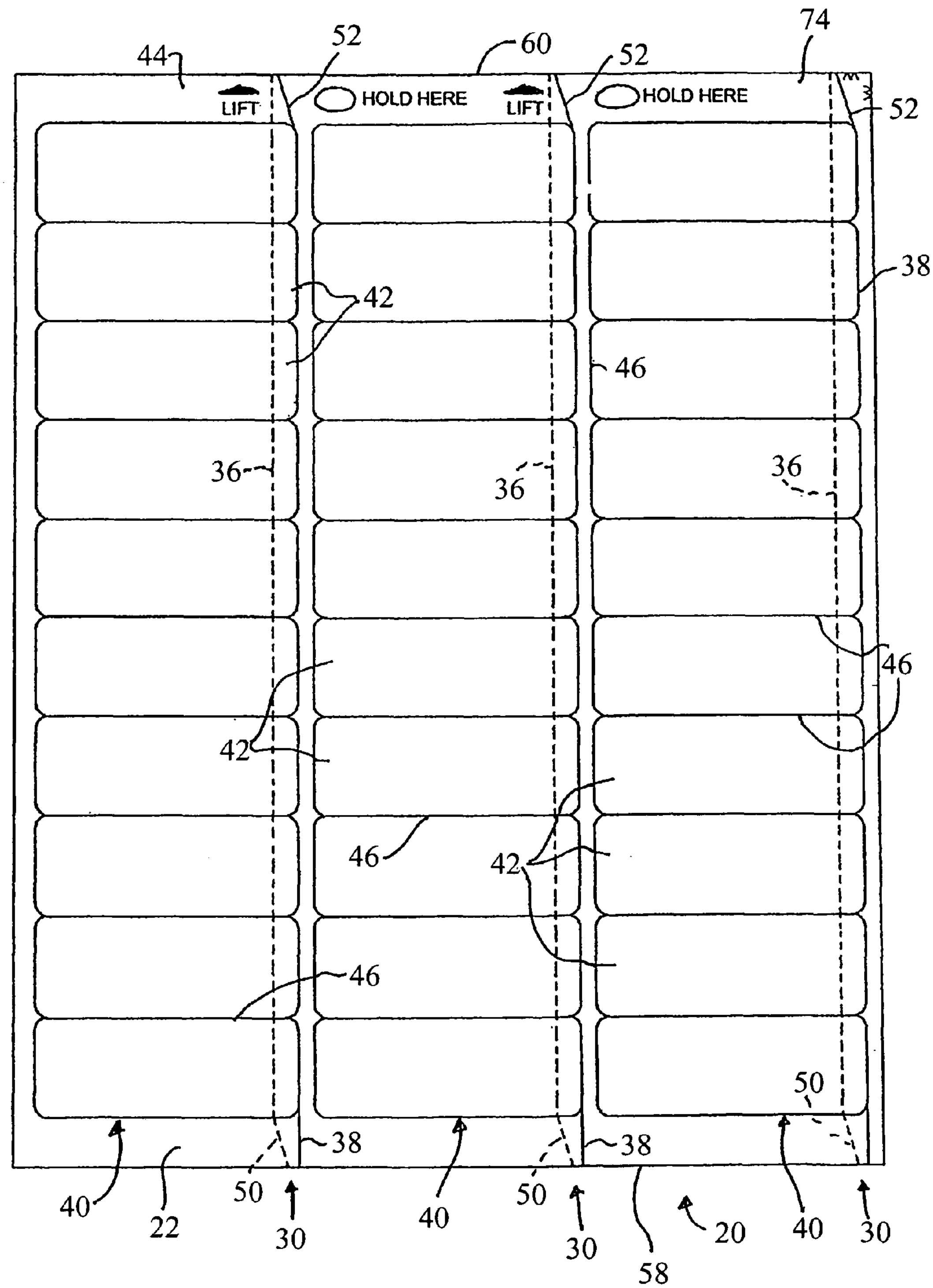
FIG. 1 is a plan view of a label assembly according to one embodiment of the invention.

FIG. 1 illustrates a label assembly 20 (not necessarily shown to scale), according to one embodiment of the invention. Label assembly 20 is desirably formed of a face sheet 22 and a back sheet (not shown in FIG. 1). The back sheet is desirably about the same size as the face sheet 22, but may be differently sized, such as slightly larger or smaller than the face sheet 22. The surface of the face sheet 22 that is disposed toward a back sheet 26 includes a layer of an adhesive material. The adhesive layer can include any adhesive material known and available to those skilled in the art for forming pressure sensitive, or self-adhesive labels. The back sheet 26 is desirably formed of a material to which the adhesive coating adheres less than or significantly less than to the face sheet 22, such as is known for forming pressure sensitive, or self-adhesive, labels. The adhesive coating covered by the back sheet 26 is applied to the face sheet 22 in any suitable manner known to those skilled in the art.

The sheet assembly 20 is of any suitable shape, and generally any suitable size that can be accepted by and fed through a printer, such as a laser printer or an ink jet printer. Common sizes of paper generally fed through printers are 8.5 inches by 5.5 inches, 8.5 inches by 11 inches, 8.263 inches by 11.688 inches (A4 size), and 8.5 inches by 14 inches. The face sheet 22 is preferably, but not necessarily, constructed of any suitable paper, paper composite, non-metal and/or metal material that can be used as a label. Other suitable materials for constructing the face sheet 22 include, for example, fabric, plastic, and/or metal foils.

The face sheet 22 desirably has a printable surface on a side opposite the adhesive coating. In some embodiments of the invention, the back sheet 26 has a printable surface, such as on a side opposite the adhesive coating. The phrase "printable surface" relates to a surface of any type of matter upon which a person or machine can draw, print, color, paint, photocopy, write, emboss, or make any other type of mark and/or graphic. Laser printers, ink jet printers, impact printers, thermal transfer printers, direct thermal printers, typewriters, or any other suitable graphic printing devices are preferred but not necessary for use with printable surfaces according to the invention.

The face sheet 22 and the printable surface can be any of a variety of face materials used to make pressure sensitive labels, or self-adhesive labels. Such face materials may include, but are not limited to: smudgeproof stock, litho stock, cast coated stock, tag stock, fluorescent stock, foils, computer printable polyester, vinyl, satin cloth, Tyvek™ material, flexible plastic, book papers, photo quality papers and/or photo quality film. Furthermore, various portions of the face materials can be different colors, thereby resulting in different colored parts.

Figure 3:
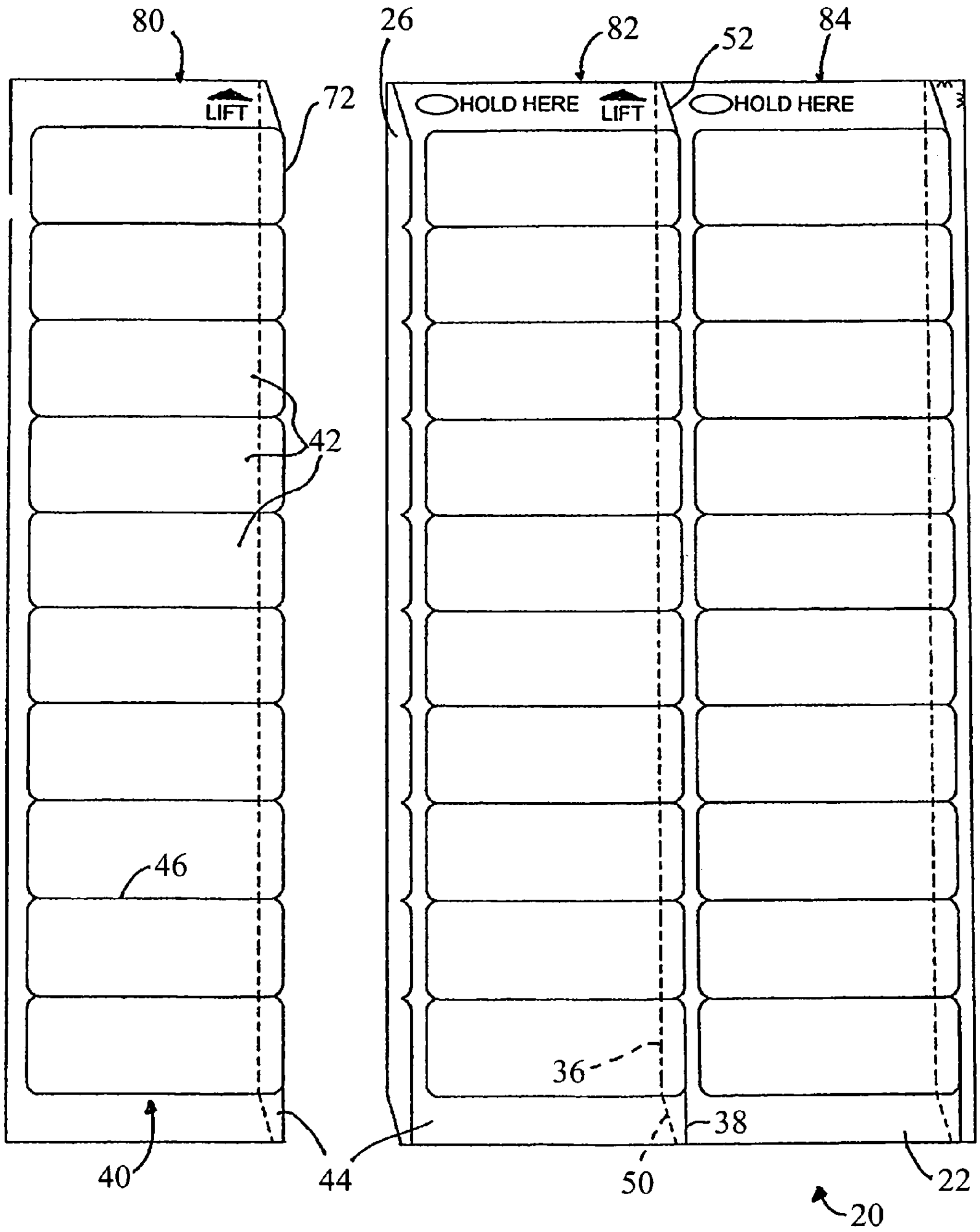
FIG. 3 is a plan view of the label assembly of FIG. 1 after separation of a first label column portion.
Figure 4:
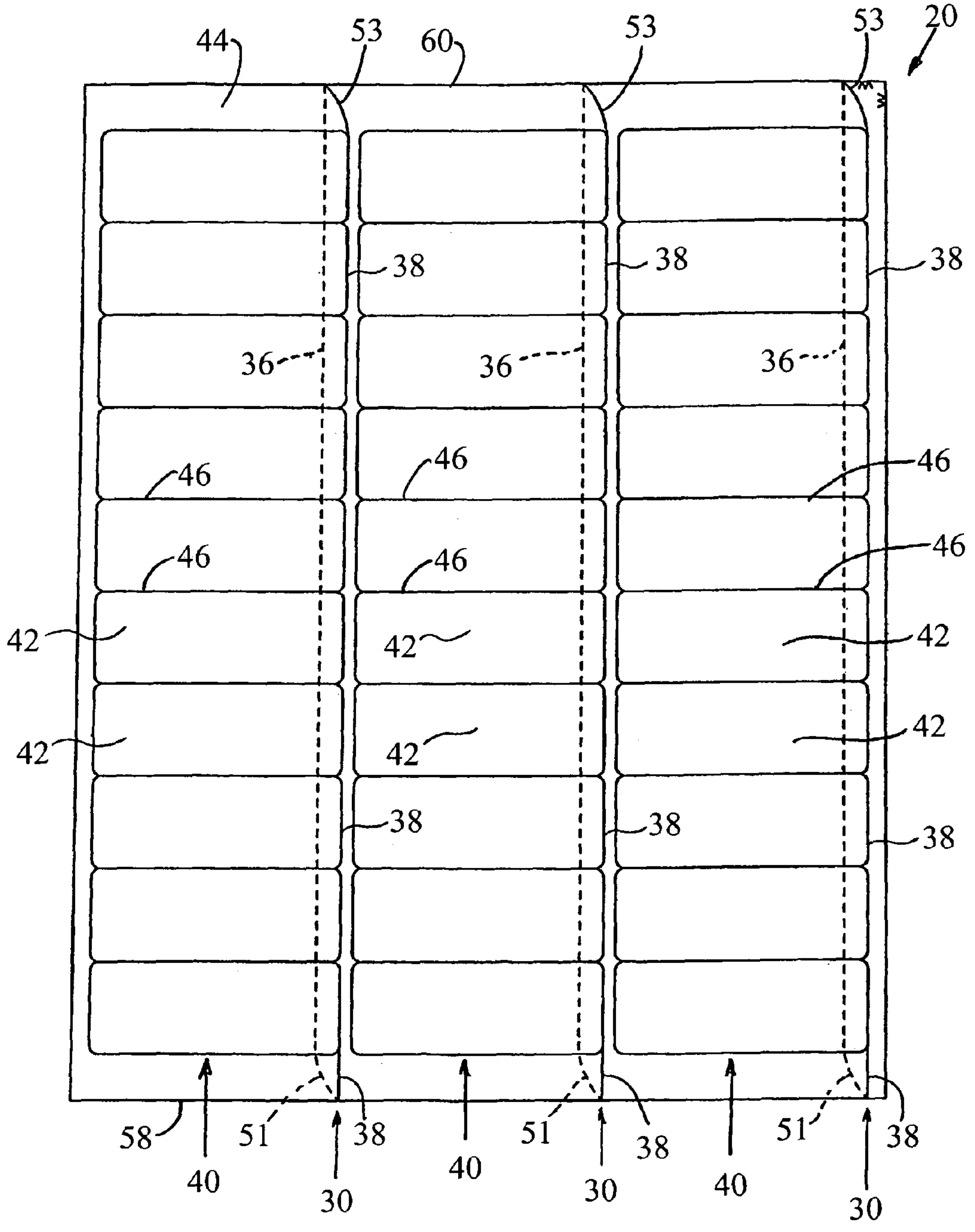
FIG. 4 is a plan view of a label assembly according to another embodiment of the invention.

As shown in FIG. 1, label assembly 20 can be separated along separation lines 30 to divide label assembly 20 into portions 80, 82, and 84, such as shown in FIG. 3. As also shown in FIGS. 1 and 4, three separation lines 30 are used to divide label assembly 20, but the label assembly 20 will be described below with reference to only one of the separation lines 30. It is apparent that any other suitable number of separation lines 30 can be used to divide label assembly 20 into any suitable number of equal or unequal portions. The separation line 30 can be formed by a first tearable line of separation 36 extending across the back sheet 26 and one or more second tearable line of separation 38 extending across the face sheet 22. The first and second tearable lines of separation 36 and 38 are offset from each other, for example by less than about 1 cm.

As used throughout this specification and in the claims, the phrase "tearable line," the phrase "line of separation," and/or the phrase "tearable line of separation" is intended to relate to a line of weakening of the structure of the face sheet 22 and/or the back sheet 26. The line of weakening has a weakened structural area along which the face sheet 22 and/or the back sheet 26 can be separated. Each tearable line or line of weakening, according to the invention, comprises at least one of a die cut line, a kiss cut line which is a die cut line that does not extend completely through a layer or a sheet, a laser die cut line, a score cut line, a perforation line which is also known as a line of cuts and ties, a microperforation line, a chemically etched line, a liquid etched line and/or a gas etched line. Tearable line 36 and/or tearable line 38 of the invention may comprise any other suitable separation line or line of weakening known to those skilled in the art of label assemblies.

The face sheet 22 in FIG. 1 and FIG. 4 includes three label columns 40, each including a plurality of labels 42. The labels 42 are shown as rectangular labels, but can be of any of various shapes such as square or circular. Also, the shape, dimensions and/or configuration of the label columns 40 can vary depending on need and the shape of the labels. For example, the label columns can run vertically as shown, horizontally and/or diagonally. The number of labels per label column or area depends on the size and shape of the labels.

A matrix 44 can border each of the label columns 40. Each label 42 can abut a portion of the matrix 44 and can be separated from the matrix 44 and an adjacent label 42 by a tearable line of separation 46. The first tearable line of separation 36 formed in the back sheet 26 runs or extends below the labels 42 within the label column 40. In one embodiment, such as shown in FIG. 3, the second tearable line of separation 38 includes a portion that is disposed along, and forms in part, the labels 42, and extends in a direction generally parallel to a portion of the first tearable line of separation 36.

As used throughout this specification and in the claims, the term "first" and the term "second" and/or other similar terms are intended to be interchangeable with each other in situations where role reversals of elements and/or method or process steps are possible.

Figure 2:
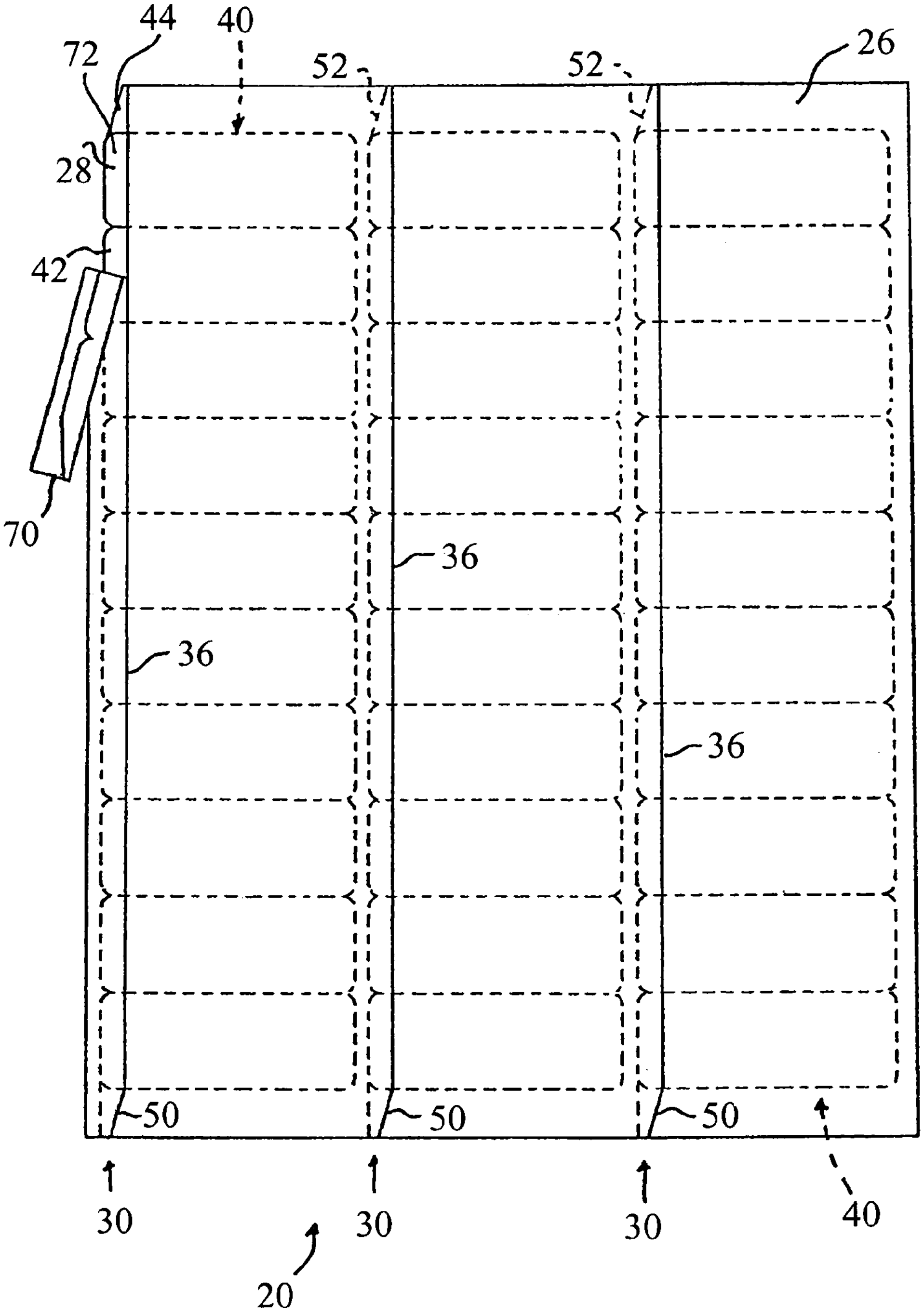
FIG. 2 is a plan view of an opposite side of the label assembly of FIG. 1.
Figure 5:
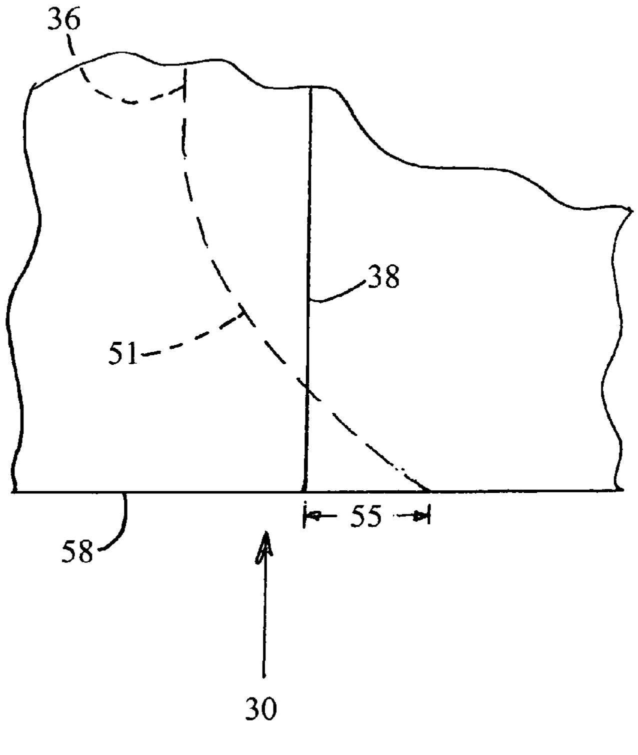
FIG. 5 is an enlarged plan view of a portion of a label assembly, according to another embodiment of the invention.

In some embodiments of the invention, such as shown in FIGS. 1-3, the first tearable line of separation 36 includes an angled portion 50 that extends at an angle to, and toward, the second tearable line of separation 38. In other embodiments of the invention, such as shown in FIGS. 4 and 5, the first tearable line of separation 36 includes a non-linear section 51 positioned near edge 58 and/or near edge 60 of the label assembly 20. The angled portion 50 and/or the non-linear section 51 desirably helps hold the sheet portions together during printing. At an opposite end of the separation line 30 from the angled portion 50 or the non-linear section 51, the second tearable line of separation 38 includes an angled portion 52 or non-linear section 53 that extends at an angle or arcuately to, and toward, the first tearable line of separation 36. The angled portions 50 and 52 or the non-linear sections 51 and 53 extend in the matrix 44 or the back sheet 26, respectively between the label column 40 and an edge 58 and an edge 60, respectively, of the label assembly 20. As will be appreciated by those skilled in the art following the teachings herein provided, various and alternative configurations are available for the separation line 30 of the invention. For example, the two angled portions 50 and 52 or the two non-linear sections 51 and 53 could both be in the face sheet 22 or the back sheet 26, or only one end of the separation line can include an angled portion or a non-linear section. Also, various angles are available for the angled end portions or the non-linear sections of the invention.

In one particularly preferred embodiment of the invention, referring to FIG. 1, the first tearable line of separation 36 is formed of a perforated line of weakness having a plurality of cuts and ties and the second tearable line of separation 38 is formed by a die cut or a kiss cut through the face sheet 22. Desirably, the portion of the first tearable line of separation 36 along the label column 40 includes the cuts and ties, and the angled portion 50 or the non-linear section 51 is formed of only a cut, e.g., a die cut, with no tie within the angled portion 50 or the non-linear section 51. In other embodiments of the invention, the first tearable line of separation 36 is formed of only a die cut and/or a kiss cut. In some embodiments of the invention, the angled portions 50 and 52 or the non-linear sections 51 and 53 stop short of the respective edge 58 and/or 60 of the label assembly 20, leaving a breakable material bridge, similar to a tie, at the edge 58 and/or 60 in order to provide additional strength and support during running through a printer. In some embodiments, at the edges 58 and 60 of the label assembly 20, the first tearable line of separation 36 is separated from the second tearable line of separation 38 by a distance of about 0.04 inch to about 0.08 inch, but can be any other suitable distance.

The first line of separation 36 can include at least a portion running generally parallel to the longitudinal direction of the label column 40, and disposed about 0.4 to about 1.0 centimeters, and desirably about 0.6 centimeters, from one longitudinal edge of the label column 40. The exact distance is not critical, but desirably the first tearable line of separation 36 is offset from that edge of the label column 40 far enough so that when the strip 70 is removed, the labels 42, as shown in FIG. 2, can be easily grasped and removed by the user. At the same time, the first line of separation 36 is close enough to a corresponding edge of the label column 40 such that when the strip 70 is removed, a narrow enough edge portion 72 of the labels 42 with the adhesive 28 is exposed so that when the label assembly 20 is placed onto a surface, the exposed edge of the unremoved labels 42 do not easily and inadvertently stick to the surface.

FIGS. 2 and 3 illustrate an operation of the separation lines 30 of the label assembly 20. FIG. 2 shows the label assembly 20 from the back, showing the back sheet 26. In FIG. 2, the user has grasped one corner of label assembly 20 at approximately position 74 as shown in FIG. 1 with one thumb and forefinger, and with the other thumb and forefinger grasped the narrow strip 70 of release liner and matrix so as to focus the shear forces along the separation line 30, and has began tearing strip 70 away from the rest of the assembly 20. Alternatively, for example, one portion of the label assembly 20 can be held against a surface while another portion is lifted away from the surface to separate the label assembly 20. As shown in FIGS. 1 and 3, the front sheet 22 can include printed arrows and instructions and/or other graphics for indicating where to place the fingers during tearing.

The strip 70 tears away as the back sheet 26 is separated along the first tearable line of separation 36 and the face sheet 22 separates along the second tearable line of separation 38. After the strip 70 is completely removed by the user, the previously adjacent label column 40 is left or remains with the labels 42 mostly attached to the back sheet 26 but having a relatively narrow edge portion 72 of the labels 42 with the underlying back sheet portion removed. The user can then easily peel off the individual labels 42 by hand, one-by-one or otherwise as desired, without having to bend and manipulate the label assembly 20 each time the user wishes to remove the next label 42.

FIG. 3 shows the label assembly 20 having a full label column 40 removed therefrom. As discussed above, the label assembly 20 includes three vertical separation lines 30, with one separation line 30 associated with each label column 40. The separation lines 30 divide the label assembly 20 into three individual label portions 80, 82, and 84, which may be individually separated from each other. In FIG. 3, the left hand portion 80 has been separated from the still combined or assembled center portion 82 and the right hand portion 84. The labels within the left hand portion 80 are now ready to be easily peeled one by one from the back sheet 26 and applied to envelopes or other substrates or surfaces. Portions 82 and 84 do not have any portions of the labels 42 with their adhesive sides exposed. Thus, the portions 82 and 84 can be handled and/or stored for later use without any degradation of the adhesive on the backs of those labels. Remaining portions 82 and 84 could even be fed through a printer for later printing. For example, if only ten or fewer labels are needed to be printed and used, the user could run label assembly 20 through a printer and print only on labels within the label column in the portion 80. The user would then separate the portion 80 and use the labels within that portion. Remaining combined portions 82 and 84 could be stored for later use. When additional labels are ready to be printed, the label assembly 20 could be fed through the printer.

FIG. 4 shows another embodiment of the label assembly 20, according to the invention. As shown in FIG. 4, the second tearable line of separation 38 includes or comprises the non-linear section 51 positioned near the edge 60 of the label assembly 20. Also as shown in FIG. 4 by the dashed lines, the first tearable line of separation 36 includes or comprises the non-linear section 51 positioned near the edge 58 of the label assembly 20. As shown in FIG. 4, the edge 58 is opposite the edge 60 on the label assembly 20. However, any other suitable relationship can exist between the edge 58 and the edge 60.

In some embodiments of the invention, the non-linear section 51 and/or the non-linear section 53 each has an arcuate shape. In some embodiments of the invention, the arcuate shape can have a radius of curvature, for example in a range from about 0.01 feet to about 5.0 feet, or any other suitable distance or measurement.

As shown in FIG. 4, the non-linear section 51 arcs in a direction toward the edge 58. In some embodiments of the invention, the non-linear section 53 arcs in a direction toward the edge 60. As shown in FIG. 4, a first direction that the non-linear section 51 arcs is generally opposite a second direction that the non-linear section 53 arcs. In some embodiments of the invention, the non-linear section 51 has a shape similar to the non-linear section 53.

As shown in FIG. 4, the edge 60 is at or near a top of the label assembly 20, and the edge 58 is at or near the bottom of the label assembly 20.

As shown in FIG. 4, the first tearable line of separation 36 does not intersect with or avoids intersection with the second tearable line of separation 38.

As shown in FIG. 5, the first tearable line of separation 36 intersects the edge 58 of the label assembly 20 at a distance 55 from an intersection of the second tearable line 38 and the edge 58. The distance 55 can be used to better separate the portions 80, 82 and 84 from each other. The arcuate or curved shape of non-linear section 51 and/or non-linear section 53 can be used to reduce the forces necessary for separating the portions 80, 82 and/or 84 with respect to each other.

Thus, the invention provides an improved label assembly structure for promoting easy removal of labels from the label assembly.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. In a method for separating a label assembly having a face sheet adhered to a back sheet, wherein an adhesive is positioned between at least a portion of a coextensive area of said face sheet and said back sheet, at least one separation line divides the label assembly into at least two portions, a first tearable line of separation extending across said back sheet and a second tearable line of separation extending across said face sheet at least partially forms each said separation line, and each said first tearable line of separation is offset with respect to said second tearable line of separation, the method comprising:

separating the label assembly into the at least two portions by tearing a first non-linear section of a first end portion of the first tearable line of separation near a first edge of the label assembly, tearing a first linear section of the second tearable line of separation, tearing a second linear section of the first tearable line of separation, and tearing a second non-linear section of a second end portion of the second tearable line of separation near a second edge of the label assembly which is at a distance from the first edge.

2. In the method according to claim 1, wherein the first non-linear section and/or the second non-linear section is tearable along an arcuate shape.

3. In the method according to claim 2, wherein at least a portion of the arcuate shape has a radius of curvature in a range from about 0.05 feet to about 5.0 feet.

4. In the method according to claim 1, wherein the first non-linear section is tearable in a first direction toward a first edge of the label assembly, and the second non-linear section is tearable toward a second edge of the label assembly in a second direction which is generally opposite the first direction.

5. In the method according to claim 1, wherein the first tearable line of separation is torn to intersect the first edge at a distance from an intersection of the second tearable line of separation and the first edge.

6. In the method according to claim 1, wherein the second tearable line of separation is torn to intersect the second edge at a distance from an intersection of the first tearable line of separation and the second edge.

7. In the method according to claim 1, wherein the second tearable line of separation is torn to intersect the second edge at an intersection of the first tearable line of separation and the second edge.

8. In the method according to claim 1, wherein the first tearable line of separation is torn to intersect the first edge at an intersection of the second tearable line of separation and the first edge.

9. In the method according to claim 1, wherein the face sheet of one said portion of the label assembly includes a column of a plurality of labels and the column is positioned adjacent the separation line.

10. In the method according to claim 1, wherein the label assembly is routed through a printer before the label assembly is separated.

* * * * *